3,078,215
PROCESS FOR THE PURIFICATION AND CONCEN-
TRATION OF POLIOMYELITIS VACCINE
Karl Heinz Fantes, Bushey, England, assignor to Glaxo
Group Limited, Greenford, England, a British company
No Drawing. Filed Dec. 16, 1960, Ser. No. 76,106
Claims priority, application Great Britain Dec. 22, 1959
13 Claims. (Cl. 167—78)

This invention is concerned with improvements in or relating to the production of poliomyelitis vaccine.

The production of poliomyelitis vaccines involves various stages including culturing the live virus on a suitable substrate, inactivation of the live virus to produce antigenic material containing inactivated virus and purification of said material to give the final vaccine product suitable for administration.

It is an object of the present invention to provide an improved process for the purification and/or concentration of material containing live or inactivated virus which is capable of being applied at any desired stage in the production of a vaccine.

We have found that material containing live or inactivated poliomyelitis virus can be purified and/or concentrated by adsorption on aluminium phosphate at acid pH and elution of the virus and/or antigen-containing material therefrom.

According to the invention, therefore, we provide a process for the purification and/or concentration of material containing live poliomyelitis virus and/or antigenic material derived therefrom, which comprises adsorbing said virus and/or antigenic material at acid pH from an aqueous medium onto aluminium phosphate and subsequently eluting said virus and/or antigenic material therefrom by means of an aqueous medium at a pH greater than 7.

The pH at which adsorption of the live virus or antigenic material takes place depends upon the strain of virus used and upon the quantity of aluminium phosphate present. In general the smaller the quantity of aluminium phosphate used the lower is the maximum pH at which adsorption can be achieved. Variation of the maximum pH at which adsorption takes place according to the strains is demonstrated by our observation that with type I virus a pH of less than 5.8 is desirable, whilst with types II and III adsorption is preferably effected at a pH of less than 6.8 though pH values of less than 6.5 and 6.0 respectively are desirable. Using type I virus the preferred pH is 4.7–5.2 whilst for types II and III the preferred pH is 5.0–5.5. The pH ranges necessary for adsorbing antigens are in general the same as for the live virus from which the antigen is obtained. Within the preferred pH ranges adsorption is generally substantially complete, and at least partial separation is secured from other proteins present. In general at pH values below 4.5, whilst adsorption of the virus or antigenic material may be complete, substantially the whole of any other protein present may also be adsorbed thus losing the advantage of purification; concentration may however still be obtained.

The aluminium phosphate which is used as adsorbent is preferably in the form of a freshly prepared gel which may be prepared, for example, by mixing a solution of aluminium chloride with a solution of trisodium phosphate, the gel being separated from the supernatant liquid, for example by decantation or centrifugation of the supernatant liquid, after a convenient time. The concentration of $AlPO_4$ per mg. of gel as prepared may readily be determined by evaporating a sample volume thereof to dryness and ascertaining the weight of the residue.

The adsorption of the virus or antigen may be achieved by adding the required amount of gel to the virus or antigen containing fluid to give the required aluminium phosphate concentrations. Various concentrations of aluminium phosphate may be used for adsorption but we have found concentrations of from 0.05 mg.–8 mg./ml. $AlPO_4$ to be generally suitable. Preferably the concentration of $AlPO_4$ is from 0.1–4 mg./ml. and very good results are in general obtained at a concentration of from 0.1 to 1 mg. $AlPO_4$/ml.

Adsorption is conveniently effected by agitating aluminium phosphate in the virus containing fluid until adsorption is complete.

Elution is preferably carried out at a pH in excess of 8. Suitable eluants include alkaline aqueous solutions such as aqueous solutions of alkalis for example alkali-metal and alkaline-earth metal hydroxides, carbonates and bicarbonates, in particular sodium or potassium hydroxide or carbonate. Buffered solutions are conveniently used as eluants and aqueous solutions of disodium or dipotassium hydrogen phosphate are particularly suitable. A preferred eluant is a 0.2 M aqueous solution of disodium hydrogen phosphate. Elution may be carried out of a pH of as high as 10.5–11 but pH's above this are preferably avoided since damage to the virus or antigenic material may then result. The eluant may if desired constitute for example a physiological saline solution or a growth medium adjusted to the required pH for elution.

Substantially complete elution may be obtained using a smaller quantity of liquids as eluant than the quantity of liquid from which the virus and/or antigenic material has been adsorbed, so that a concentration of activity is thereby achieved.

Elution may be carried out in any desired manner but we have found it convenient merely to add the aluminium phosphate containing the adsorbed material to the eluant and allow the mixture to stand for a time sufficient to effect elution, for example from 0.1–2 hours, preferably from 0.25–0.5 hours. The elution may be facilitated by dispersion of the adsorbent in the eluant, for example by shaking, mixing or any other desired procedure.

The process according to the invention can be applied in the production of poliomyelitis vaccine from any type of poliomyelitis virus, such as types I, II or III.

The process may be applied at any convenient stage in the production of the vaccine either before or after inactivation of the virus. Thus one may directly subject the virus culture to the process according to the invention, preferably after removal of cell debris, to achieve a concentration and purification of the virus. One may also apply the process according to the invention to the virus-containing liquid after the virus has been inactivated, for example by treatment with formaldehyde, whereby concentration and purification of antigenic material is achieved.

In the production of vaccines one of the principal contaminants present in the virus-contaning liquid is proteinaceous material derived from the animal cell substrate e.g. kidney cell tissue, used for the culture of the virus. By the process according to the invention it is possible to achieve at least a partial separation of the live virus or antigenic material derived therefrom from such proteinaceous contaminants, as the virus or antigenic material is adsorbed onto and eluted from the aluminium phosphate to a different degree than are the proteinaceous contaminants.

Thus, by operating within the preferred pH ranges and $AlPO_4$ concentrations specified above it is possible to achieve at least a degree of selective adsorption of the virus or antigenic material compared with the proteinaceous contaminants; elution of the adsorbed material from the aluminium phosphate under the conditions specified above can also lead to a further separation as the virus or antigenic material is eluted from the adsorbent more readily than some of the proteinaceous contaminants. In fact, by suitable adjustment of the pH of adsorption and concentration of aluminium phosphate and by suitable control of elution both the adsorption and elution steps can be made to act selectively in favor of the separation (and therefor purification) of the virus or antogenic material from the proteinaceous contaminants. The present process is however useful where concentration only is desired, for example to concentrate a vaccine which is substantially free of undesired protein but is of low potency.

In order that the invention may be well understood the following examples are given by way of illustration only:

In the examples the aluminium phosphate gel was prepared as follows:

To a stirred solution of 320 g. $Na_3PO_4$ in 100 l. distilled water a solution of 200 g. $AlCl_3.6H_2O$ in 2 l. distilled water was added slowly. The resulting suspension was allowed to settle overnight, and the supernatant liquid was siphoned off. The residue was resuspended in 20 l. distilled water and again allowed to settle, the supernatant liquid being again siphoned off. The residue was again resuspended in 20 l. distilled water, its pH adjusted to 6.5 by the addition of normal HCl and the suspension centrifuged at 1200 r.p.m. for one hour. The supernatant was discarded, the gel resuspended in 4 l. water, the pH was adjusted to 6.5 and the suspension was sterilised with 30 minutes free steam and 20 lbs. for 30 minutes. The pH of the final suspension was 6.2.

The adsorptive properties of this material did not seem to change on several weeks storage at room temperature.

In another preparation the initial resuspensions were carried out in M/100 phosphate buffer (pH 6.8.) The final washings were done with distilled water. The final material had very similar properties to the one just described.

EXAMPLE 1

*The Purification and Concentration of Type I, Maitland-Grown and Formalin Inactivated Virus*

100 ml. portions of the vaccine were adjusted to pH's 4.5, 5.0, 5.5, 6.0 and 6.5 (with N HCl). To these solutions sufficient $AlPO_4$ suspension was added to give final concentrations of 1.0, 0.4 and 0.1 mg./ml. The $AlPO_4$ suspensions were adjusted to the pH's of the vaccine portions before they were added. The vaccine-$AlPO_4$ mixtures were then mechanically shaken for two hours and centrifuged at 2500 r.p.m. for 10 minutes. The supernatant liquids were poured off and set aside for complement fixation assay. To each precipitate 5 ml. of 0.2 M $Na_2HPO_4$ were added and the suspensions again shaken for ½ hour and centrifuged. The $AlPO_4$-free eluates were then subjected to complement fixation assay. Monkey kidney protein (M. K.) in the supernatants and eluates was also assayed by complement fixation. For the poliomyelitis antigen assay the starting material and the "supernatants" were first concentrated by dialysis against carbowax solution, as described by J. Kohn (Nature 183, (4667), 1055, 1959).

Results were as follows:

| pH of $AlPO_4$ vaccine suspension | Mg./ml. $AlPO_4$ in mixture | Supernatants (100 ml.) | | Eluates (5 ml.) | |
|---|---|---|---|---|---|
| | | Polio | M. K. | Polio | M. K. |
| 4.5 | 1.0 | (Conc. x 8) 1/1 | (Neat) 1/1 | (Neat) 1/4 | (Neat) 1/32. |
| | 0.4 | (Conc. x 30) 1/1 | (Neat) 1/1 | (Neat) 1/5 | (Neat) 1/16. |
| | 0.1 | (Conc. x 16) 1/1 | (Neat) 1/1 | (Neat) 1/5 | (Neat) 1/16. |
| 5.0 | 1.0 | (Conc. x 17) 1/1 | (Neat) 1/1 | (Neat) 1/4 | (Neat) 1/16. |
| | 0.4 | (Conc. x 6) 1/1 | (Neat) 1/1.5 | (Neat) 1/5 | (Neat) 1/1. |
| | 0.1 | (Conc. x 11) 1/1 | (Neat) 1/2 | (Neat) 1/4 | (Neat) 1/1. |
| 5.5 | 1.0 | (Conc. x 11) 1/1 | (Neat) 1/3 | (Neat) 1/4 | (Neat) 1/7. |
| | 0.4 | (Conc. x 15) 1/1 | (Neat) 1/4 | (Neat) 1/2 | (Neat) 1/1. |
| | 0.1 | (Conc. x 30) 1/2 | (Neat) 1/4 | (Neat) 1/1.5 | (Neat) 1/1. |
| 6.0 | 1.0 | (Conc. x 10) 1/2 | (Neat) 1/4 | (Neat) 1/1 | (Neat) 1/1. |
| | 0.4 | (Conc. x 15) 1/3 | (Neat) 1/4 | (Neat) 1/1 | (Neat) 1/1. |
| | 0.1 | (Conc. x 17) 1/3 | (Neat) 1/5 | (Neat) 1/1 | (Neat) 1/1. |
| 6.5 | 10.0 | (Conc. x 5) 1/3 | (Neat) 1/4 | (Neat) 1/2 | (Neat) 1/2. |
| | 1.0 | (Conc. x 17) 1/4 | (Neat) 1/6 | (Neat) 1/1 | (Neat) 1/1. |
| | 0.4 | (Conc. x 25) 1/6 | (Neat) 1/5 | (Neat) 1/1 | (Neat) 1/1. |
| | 0.1 | (Conc. x 5) 1/1 | (Neat) 1/5 | (Neat) 1/1 | (Neat) 1/1. |

NOTE.—Starting material (100 ml), conc. x 5, polio 1/1.7, M. K. (neat) 1/3.

These results show that at pH 4.5 and 5.0 no poliomyelitis antigen could be detected in the supernatants and that the recovery of the antigen in the eluate was practically quantitative. A very considerable purification from monkey kidney protein was also achieved, especially when the lower concentrations (0.1 mg./ml. and 0.4 mg./ml.) of $AlPO_4$ were used at pH 5. At pH 5.5 only the highest level of $AlPO_4$ (1.0 mg./ml.) gave a good recovery of the poliomyelitis antigen in the eluate. At higher pH's no appreciable adsorption of the poliomyelitis antigen took place, at pH 6.5 not even when 10 mg./ml. $AlPO_4$ was used.

EXAMPLE 2

*The Concentration and Purification of Type III, Maitland-Grown, Inactivated Virus*

The experimental conditions were similar to those of Example 1. 0.4 mg./ml. $AlPO_4$ were employed at pH 5.0 and 6.0, elution was carried out with 5 ml. 0.2% $NaHCO_3$.

| pH of $AlPO_4$ vaccine suspension | Mg./ml. $AlPO_4$ in mixture | Supernatants (100 ml.) | | Eluates (5 ml.) | |
|---|---|---|---|---|---|
| | | Polio | M. K. | Polio | M. K. |
| 6.0 | 0.4 | (Conc. x 10) 1/1.5 | (Neat) 1/2 | (Neat) 1/2 | (Neat) 1/4. |
| 5.0 | 0.4 | (Conc. x 20) 1/1 | (Neat) 1/1 | (Neat) 1/16 | (Neat) 1/16. |

NOTE.—Starting fluid (100 ml.), polio 1/6, conc. x 12, M. K. (neat) 1/4.

EXAMPLE 3

*The Concentration and Purification of Live Type I, Maitland-Grown, Virus*

Experimental conditions were as described above, and elutions were carried out with 0.2 M $Na_2HPO_4$.

| pH of $AlPO_4$ vaccine suspension | Mg./ml. $AlPO_4$ in mixture | Supernatants (100 ml.) | | Eluates (5 ml.) | |
|---|---|---|---|---|---|
| | | Polio | M. K. | Polio | M. K. |
| 5.0 | 1.0 | (Conc. x —) 1/1 | (Neat) 1/2 | (Neat) 1/32 | 1/64. |
| | 0.4 | (Conc. x 25) 1/1 | (Neat) 1/1.5 | (Neat) 1/24 | 1/56. |
| | 0.1 | (Conc. x 50) 1/6 | (Neat) 1/4 | (Neat) 1/24 | 1/40. |

NOTE.—Starting material (100 ml.), polio 1/32, conc. x 25, M. K. (neat) 1/6.

EXAMPLE 4

*The Concentration and Purification of Live Type II, Maitland-Grown, Virus*

Experimental conditions were as above, elutions were were carried out with 0.2% $NaHCO_3$.

| pH of adsorption | Mg./ml. $AlPO_4$ in mixture | Supernatants (100 ml.) | | Eluates (5 ml.) | |
|---|---|---|---|---|---|
| | | Polio | M. K. | Polio | M. K. |
| 6.0 | 0.4 | (Conc. x 7) 1/1 | (Neat) 1/2 | (Neat) 1/4 | (Neat) 1/8. |
| | 0.1 | (Conc. x 12) 1/1 | (Neat) 1/2 | (Neat) 1/4 | (Neat) 1/4. |
| 5.0 | 0.4 | (Conc. x 12) 1/1 | (Neat) 1/1 | (Neat) 1/5 | (Neat) 1/8. |
| | 0.1 | (Conc. x 13) 1/1 | (Neat) 1/1 | (Neat) 1/3 | (Neat) 1/4. |

NOTE.—Starting material: Polio 1/1 (conc. x 4), M. K. 1/3 (neat).

EXAMPLE 5

*The Concentration of Live Type I Virus, Grown on Trypsin Treated Monkey Cells*

Experimental conditions were as above, elutions were done with 0.2 M $Na_2HPO_4$. In this experiment the concentration of the virus was checked by infectivity instead of complement fixation titrations. It is shown that infectivity too is fully recovered in the eluate.

| pH of adsorption | Mg./ml. $AlPO_4$ in mixture | Supernatants (100 ml.), infectivity titre | Eluates (5 ml.), infectivity titre |
|---|---|---|---|
| 5.0 | 0.1 | $10^{-4.9}$ | $10^{-7.6}$ |

NOTE.—Starting material (100 ml.), infectivity titre: $10^{-6.2}$.

EXAMPLE 6

*The Concentration of Live Type I Virus, Grown on Trypsin Treated Monkey Cells*

$AlPO_4$ was added to 12.5 l. of virus fluid to a final concentration of 0.2 mg./ml. The pH of the mixture was adjusted to 4.7 with acetic acid. The mixture was then stirred by means of a magnetic stirrer for 2 hrs. After settling, most of the supernatant was siphoned off, the remainder was removed by spinning. The virus was eluted by suspending the precipitate in 125 ml. of 199 medium (to which 1% sodium bicarbonate had been added) and shaking for ½ hour, followed by removal of the precipitate by centrifuging.

| | Volume | Infectivity titre | Total protein, mg. |
|---|---|---|---|
| Starting fluid | 12.5 l. | $10^{-5.55}$ | 687 |
| Supernatant | 12.5 l. | $10^{-3.85}$ | 337 |
| Eluate | 125 ml. | $10^{-7.65}$ | 49 |

I claim:

1. A process for the concentration of a material in an aqueous medium, said material being selected from the group consisting of live poliomyelitis virus and inactivated poliomyelitis virus, which process comprises adsorbing said material from a first volume of aqueous medium onto aluminium phosphate at a pH less than 7, separating the aluminium phosphate and adsorbed material from said first volume of aqueous medium, contacting said aluminium phosphate having said material adsorbed thereon with a second volume of aqueous medium at a pH greater than 7 to thereby wash said material from said aluminium phosphate, said second volume of aqueous medium being materially smaller than the first volume of aqueous medium, and separating said aluminium phosphate from said second volume of aqueous medium to obtain in said second volume of aqueous medium a concentration of said material substantially free of aluminium phosphate which is materially greater than the concentration of said material in said first volume of aqueous medium.

2. A process as claimed in claim 1 in which the concentration of aluminium phosphate used for adsorption is between 0.05 mg. and 8 mg. per millilitre of medium from which adsorption takes place.

3. A process as claimed in claim 1 in which the elution takes place at a pH between 8 and 11.

4. A process as claimed in claim 1 in which the eluant is a buffered solution.

5. A process as claimed in claim 1 in which said material is impure in said first volume of aqueous medium and is at least partially purified when eluted into said second volume of aqueous medium.

6. A process as claimed in claim 1 in which the ratio of said first volume of aqueous medium to said second volume of aqueous medium is 20:1 to 100:1.

7. A process as claimed in claim 1 in which the virus is poliomyelitis virus type I and adsorption takes place at a pH of less than 5.8.

8. A process as claimed in claim 7 in which adsorption takes place at a pH of at least 4.5.

9. A process as claimed in claim 7 in which adsorption takes place at a pH between 4.7 and 5.2.

10. A process as claimed in claim 1 in which the virus is selected from the group consisting of type II poliomyelitis virus and type III poliomyelitis virus and adsorption takes place at a pH of less than 6.8.

11. A process as claimed in claim 10 in which adsorption takes place at a pH between 5.0 and 5.5.

12. A process as claimed in claim 10 in which adsorption takes place at a pH of at least 4.5.

13. A process for the concentration of a material in an aqueous medium, said material being selected from the group consisting of live poliomyelitis virus and inactivated poliomyelitis virus, which process comprises adsorbing said material from a first volume of aqueous medium onto aluminium phosphate at a pH between 4.5 and 7, the concentration of said aluminium phosphate being between 0.05 mg. and 8 mg. per ml. of said first volume of aqueous medium, separating the aluminium phosphate and adsorbed material from said first volume of aqueous medium, contacting said aluminium phosphate having said material adsorbed thereon with a second volume of aqueous medium at a pH between 8 and 11 to thereby wash said material from said aluminium phosphate, said second volume of aqueous medium being materially smaller than the first volume of aqueous medium and separating said aluminium phosphate from said second volume of aqueous medium to obtain in said second volume of aqueous medium a concentration of said material substantially free of aluminium phosphate which is materially greater than the concentration of said material in said first volume of aqueous medium.

References Cited in the file of this patent

FOREIGN PATENTS 777,018    Great Britain _____ June 12, 1957

OTHER REFERENCES

Schaeffer et al.: Archives of Pathology, vol. 15, pp. 221–226, 1933.

Sabin: J. of Exp. Med., vol. 56, pp. 307–317, 1931.